US012611905B2

(12) United States Patent
Molitor et al.

(10) Patent No.: US 12,611,905 B2
(45) Date of Patent: Apr. 28, 2026

(54) TANDEM AXLE ASSEMBLY AND ASSOCIATED SYSTEMS AND METHODS

(71) Applicant: Link Manufacturing, LTD, Sioux Center, IA (US)

(72) Inventors: Mark R. Molitor, Muskegon, MI (US); Matthew C. Lohafer, Hinton, IA (US); Joel D. Van Den Brink, Rock Valley, IA (US)

(73) Assignee: LINK MFG., LTD, Sioux Center, IA (US)

( * ) Notice: Subject to any disclaimer, the term of this patent is extended or adjusted under 35 U.S.C. 154(b) by 0 days.

(21) Appl. No.: 18/422,539

(22) Filed: Jan. 25, 2024

(65) Prior Publication Data

US 2024/0253416 A1       Aug. 1, 2024

Related U.S. Application Data

(60) Provisional application No. 63/481,759, filed on Jan. 26, 2023.

(51) Int. Cl.
| | |
|---|---|
| *B60G 17/052* | (2006.01) |
| *B60G 5/04* | (2006.01) |
| *B60G 17/015* | (2006.01) |
| *B60G 17/033* | (2006.01) |
| *B60G 21/073* | (2006.01) |

(52) U.S. Cl.
CPC ........... *B60G 17/052* (2013.01); *B60G 5/043* (2013.01); *B60G 17/0155* (2013.01); *B60G 17/033* (2013.01); *B60G 21/073* (2013.01); *B60G 2202/152* (2013.01); *B60G 2204/148* (2013.01)

(58) Field of Classification Search
CPC .. B60G 17/052; B60G 5/043; B60G 17/0155; B60G 17/033; B60G 21/073; B60G 2202/152; B60G 2204/148
See application file for complete search history.

(56) References Cited

U.S. PATENT DOCUMENTS

| | | | | | |
|---|---|---|---|---|---|
| 2,974,976 | A | * | 3/1961 | Lyall ................... | B62D 61/125 |
| | | | | | 280/43.23 |
| 3,096,995 | A | * | 7/1963 | Richnow, Jr. ........ | B62D 61/125 |
| | | | | | 280/43.23 |
| 3,224,522 | A | * | 12/1965 | Fleming .............. | B60G 17/033 |
| | | | | | 280/682 |
| 3,533,641 | A | * | 10/1970 | Driskill ............... | B62D 61/125 |
| | | | | | 280/43.23 |

(Continued)

FOREIGN PATENT DOCUMENTS

WO          2010132692 A1     11/2010

*Primary Examiner* — Paul N Dickson
*Assistant Examiner* — Shams Dhanani
(74) *Attorney, Agent, or Firm* — Perkins Coie LLP

(57) ABSTRACT

Tandem axle assemblies and associated systems and components are provided for use on heavy duty trucks, trailers, and/or other vehicles. Tandem axle assemblies may include a drive axle and a non-drive lift axle mounted to a non-torque reactive suspension system having hanger brackets positioned between the tandem axles. Roll stability components of the suspension system can be located on the drive axle side of the suspension, reducing weight, cost, and complexity of the tandem axle assembly. The non-drive lift axle can be operated by a control system during vehicle dynamic operation to improve traction performance of the vehicle.

19 Claims, 4 Drawing Sheets

(56) References Cited

U.S. PATENT DOCUMENTS

| | | | | | |
|---|---|---|---|---|---|
| 3,572,745 | A | * | 3/1971 | Willetts | B60G 11/22 |
| | | | | | 267/248 |
| 3,659,671 | A | * | 5/1972 | Heinze | B62D 61/125 |
| | | | | | 280/682 |
| 3,856,325 | A | * | 12/1974 | Willetts | B60G 5/047 |
| | | | | | 403/120 |
| 3,870,336 | A | * | 3/1975 | Bilas | B60G 11/465 |
| | | | | | 280/86.5 |
| 3,964,735 | A | * | 6/1976 | Wright | B60G 7/00 |
| | | | | | 280/124.17 |
| 4,166,639 | A | * | 9/1979 | Taylor | B62D 61/125 |
| | | | | | 267/34 |
| 4,171,830 | A | * | 10/1979 | Metz | B60G 17/052 |
| | | | | | 280/86.5 |
| 4,202,277 | A | * | 5/1980 | Browne | B60F 1/046 |
| | | | | | 303/2 |
| 4,256,326 | A | * | 3/1981 | Cantrell | B62D 61/125 |
| | | | | | 280/683 |
| 5,078,420 | A | * | 1/1992 | Jable | B60G 5/053 |
| | | | | | 280/686 |
| 5,129,779 | A | * | 7/1992 | Triplett | B60P 3/40 |
| | | | | | 280/401 |
| 5,458,360 | A | * | 10/1995 | Raidel, Sr. | B60G 5/047 |
| | | | | | 280/686 |
| 5,649,719 | A | * | 7/1997 | Wallace | B60G 7/02 |
| | | | | | 280/124.108 |
| 5,816,605 | A | * | 10/1998 | Raidel, Sr. | B60G 5/00 |
| | | | | | 280/81.6 |
| 6,206,407 | B1 | * | 3/2001 | Fuchs | B60G 11/42 |
| | | | | | 280/686 |
| 6,224,074 | B1 | * | 5/2001 | Cadden | B60G 9/02 |
| | | | | | 280/678 |
| 6,293,570 | B1 | * | 9/2001 | Gottschalk | B60G 7/02 |
| | | | | | 280/86.751 |
| 6,880,839 | B2 | * | 4/2005 | Keeler | B62D 61/12 |
| | | | | | 280/124.153 |
| 8,955,858 | B2 | * | 2/2015 | Koontz | B60G 5/02 |
| | | | | | 280/124.11 |
| 9,637,189 | B2 | * | 5/2017 | Karel | B62D 61/125 |
| 11,220,304 | B1 | * | 1/2022 | Bailey | B62D 61/125 |
| 11,712,938 | B1 | * | 8/2023 | Klein | B60G 9/00 |
| | | | | | 280/86.5 |
| 11,794,545 | B1 | * | 10/2023 | Klein | B60G 11/27 |
| 2001/0007419 | A1 | | 7/2001 | Tanaka | |
| 2002/0180173 | A1 | | 12/2002 | Daily et al. | |
| 2003/0094846 | A1 | * | 5/2003 | Dodd | B60G 11/28 |
| | | | | | 298/23 R |
| 2003/0111810 | A1 | | 6/2003 | Fulton et al. | |
| 2003/0193149 | A1 | | 10/2003 | Russell et al. | |
| 2003/0214118 | A1 | * | 11/2003 | Pavuk | B60G 5/00 |
| | | | | | 280/678 |
| 2004/0007844 | A1 | | 1/2004 | Reineck | |
| 2004/0056446 | A1 | | 3/2004 | Dudding et al. | |
| 2004/0084866 | A1 | | 5/2004 | Ramsey | |
| 2004/0119260 | A1 | * | 6/2004 | Fenton | B60G 11/465 |
| | | | | | 280/124.174 |
| 2004/0178594 | A1 | | 9/2004 | Keeler et al. | |
| 2004/0188973 | A1 | | 9/2004 | Molitor | |
| 2004/0256820 | A1 | | 12/2004 | Chalin et al. | |
| 2005/0001397 | A1 | | 1/2005 | Genick | |
| 2005/0146110 | A1 | | 7/2005 | Dudding | |
| 2005/0161896 | A1 | | 7/2005 | Reineck | |
| 2006/0138741 | A1 | * | 6/2006 | Dare-Bryan | B60G 11/27 |
| | | | | | 280/124.135 |
| 2006/0157309 | A1 | | 7/2006 | Chalin et al. | |
| 2006/0208464 | A1 | * | 9/2006 | Raidel, II | B60G 5/04 |
| | | | | | 280/678 |
| 2007/0126263 | A1 | | 6/2007 | Ramsey et al. | |
| 2008/0084047 | A1 | | 4/2008 | Bluff et al. | |
| 2008/0184623 | A1 | | 8/2008 | Heigl et al. | |
| 2008/0284123 | A1 | * | 11/2008 | Billian | B60G 11/27 |
| | | | | | 280/124.116 |
| 2009/0206570 | A1 | | 8/2009 | Strong | |
| 2009/0243247 | A1 | * | 10/2009 | Richardson | B60G 11/46 |
| | | | | | 280/124.109 |
| 2010/0253032 | A1 | * | 10/2010 | Ramsey | B60G 5/047 |
| | | | | | 280/124.162 |
| 2010/0283581 | A1 | | 11/2010 | Heigl | |
| 2013/0062852 | A1 | | 3/2013 | Dodd | |
| 2013/0087984 | A1 | | 4/2013 | Gottschalk | |
| 2014/0125029 | A1 | | 5/2014 | Vandenberg et al. | |
| 2015/0014951 | A1 | * | 1/2015 | McGuire | B60G 17/005 |
| | | | | | 280/86.5 |
| 2015/0137463 | A1 | | 5/2015 | Mclennan et al. | |
| 2015/0258871 | A1 | * | 9/2015 | Remboski | B60G 17/052 |
| | | | | | 280/124.16 |
| 2015/0266375 | A1 | | 9/2015 | Tavvala et al. | |
| 2015/0273972 | A1 | | 10/2015 | Plath | |
| 2015/0336436 | A1 | * | 11/2015 | Barton | B60G 9/003 |
| | | | | | 280/86.5 |
| 2016/0046163 | A1 | | 2/2016 | Layne et al. | |
| 2016/0272025 | A1 | | 9/2016 | Mccomsey et al. | |
| 2017/0225729 | A1 | | 8/2017 | Yakimishyn | |
| 2018/0222274 | A1 | | 8/2018 | Davis et al. | |
| 2018/0319451 | A1 | | 11/2018 | Smith | |
| 2019/0054816 | A1 | | 2/2019 | Garcia et al. | |
| 2019/0061847 | A1 | * | 2/2019 | Barton | B60G 5/04 |
| 2019/0077468 | A1 | | 3/2019 | Hulstein et al. | |
| 2019/0092407 | A1 | | 3/2019 | Jacobsma et al. | |
| 2020/0398628 | A1 | * | 12/2020 | Schardt | B60G 17/017 |
| 2021/0276643 | A1 | * | 9/2021 | Ellifson | B60B 35/007 |
| 2022/0097781 | A1 | * | 3/2022 | Poole | B62D 53/061 |
| 2024/0116320 | A1 | * | 4/2024 | Rundell | B60G 9/02 |

* cited by examiner

TANDEM AXLE ASSEMBLY AND ASSOCIATED SYSTEMS AND METHODS

CROSS-REFERENCE TO RELATED APPLICATION

This application claims the benefit of U.S. Provisional Patent Application No. 63/481,759, filed Jan. 26, 2023, and titled "TANDEM AXLE ASSEMBLY AND ASSOCIATED SYSTEMS AND METHODS," which is incorporated herein by reference in its entirety.

TECHNICAL FIELD

The present disclosure is directed generally to tandem axle assemblies and, more particularly, to tandem axle assemblies having a lift axle for use with trucks, trailers, and/or other vehicles.

BACKGROUND

Many trucks carry loads that vary greatly due to the loading and unloading of cargo. To carry heavy loads, some of these trucks use one or more auxiliary non-drive rear axles in conjunction with one or more drive axles. The auxiliary non-drive rear axles may be needed for a variety of reasons, including compliance with bridge laws, truck suspension and tire ratings, etc. In certain loading conditions or while the vehicle is unloaded, the non-drive axles are not needed to carry any load, and instead can negatively impact fuel economy and experience unnecessary wear. For this reason, many of these trucks utilize non-drive axles that can be lifted off of the ground and into to a stored position (a "lifted position" or "raised position") when not needed. These axles are generally referred to as lift axles or liftable axles. By raising the lift axle when the vehicle is lightly loaded, wear on the lift axle tires can be reduced and fuel economy can be increased due to the absence of rolling resistance from the lift axle tires and bearing system.

Lift axles can be installed ahead of or behind the drive axles on a straight truck or tractor. If a lift axle is positioned ahead of the drive axle, the lift axle is referred to as a "pusher." If the lift axle is positioned behind the drive axle, it is referred to as a "tag." There are both steerable and non-steerable lift axles. As the name implies, the wheels on non-steerable lift axles cannot turn, and as a result, non-steerable lift axles are typically raised prior to turning a tight corner depending on the proximity of the non-steerable lift axle to the center of turning, to prevent rapid tire wear due to scuff and the imposition of high lateral stresses on the wheels and other chassis components. Steerable lift axles include wheels that caster in response to the vehicle turning so they can remain in contact with the ground when the axle is located further away from the center of turning.

A typical over-the-road truck specification is a "6×4" or "six-by-four" configuration, with 6 total wheel positions: one front axle having two wheel positions, and two rear axles each having two wheel positions. In the 6×4 configuration, four of the six wheel positions (typically the wheels on the rear axles) are powered by the engine through the transmission and driveshaft(s), and the non-driven axle can be a lift axle (in the pusher position if the two rear axles are powered or the tag position if the two forward axles are powered). In a "6×2" or "six-by-two" configuration, only one of the two rear axles is powered, such that only two of the six wheel positions are driven, and one of the non-driven axles can be a lift axle in either the pusher or tag position.

For certain use cases, a 6×2 configuration can provide advantages over a 6×4 configuration in fuel economy, cost, complexity, reduced weight, omission of the inter-axle driveline, etc. In some instances when the vehicle is lightly loaded, the non-driven rear axle in a 6×2 configuration is not necessary to carry the load, and it can be raised to reduce tire wear and increase fuel economy. Even with the above-noted benefits, however, some vehicle purchasers are reluctant to specify a 6×2 configuration due to concerns about reduced traction during acceleration as a result of having fewer driven wheels than a 6×4 configuration. The tractive performance of a 6×2 configuration is more sensitive to transmission, wheelbase, and other vehicle parameters than the tractive performance of a 6×4 configuration. In some instances, 6×2-configured vehicles have lower resale value compared to 6×4 configured vehicles having similar specifications.

DETAILED DESCRIPTION

Figure 1:
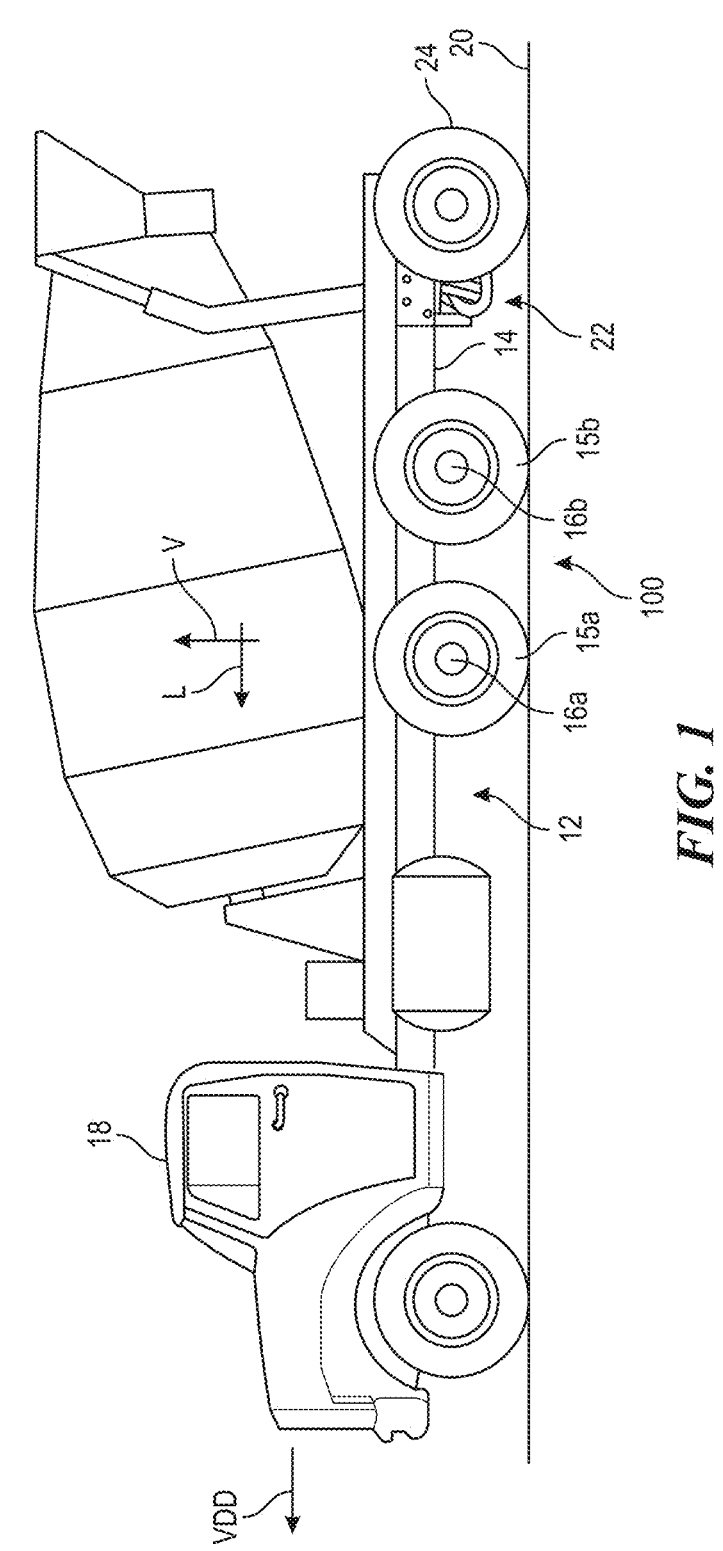
FIG. 1 is a side view of a vehicle having a lift axle system configured in accordance with embodiments of the present technology.

The following disclosure describes various embodiments of tandem axle assemblies and associated systems, components, and methods for use on heavy duty trucks, trailers, and/or other vehicles. In some embodiments, tandem axle assemblies configured in accordance with the present technology include a lift axle in a forward position or a rear position relative to the vehicle drive direction (i.e., as a pusher axle or a tag axle, respectively), and a drive axle in the other of the forward position or the rear position relative to the lift axle. The tandem axle assembly can include a suspension system configured to movably couple the lift axle and the drive axle to frame members (e.g., longitudinal "frame rails") of the vehicle. In some embodiments, the suspension system includes hanger brackets positioned between the lift axle and the drive axle to pivotably couple axle control arms to the frame rails, and load spring brackets to couple axle load springs to the frame rails. In some embodiments, the hanger brackets and/or the load spring brackets include structural and/or functional features that facilitate lateral alignment of the axles relative to the vehicle frame during installation. Such features can include, for example, some features generally similar or identical in structure and/or function to those described in U.S. Pat. No. 10,967,927, filed Sep. 20, 2018, and titled "MOUNTING BRACKETS FOR AUXILIARY SUSPENSION SYS-TEMS," which is incorporated herein by reference in its entirety.

The following description may refer to a lift axle as a "non-drive" lift axle, in which the wheels of the lift axle are not driven by an engine of the vehicle in a 6×2 configuration. However, embodiments of the present technology are suitable for use with electric-drive axle configurations in which, for example, (i) the drive axle has one or more electric motors powering the wheels of the drive axle with the lift axle being non-driven, (ii) both the drive axle and the lift axle have one or more electric motors powering the respective wheels of the axles, and/or (iii) the drive axle is driven by the engine of the vehicle and the lift axle has one or more electric motors powering the respective wheels, etc. Various lift axle systems are described in U.S. Pat. No. 5,403,031 to Gottschalk et al., U.S. Pat. No. 6,311,993 to Hulstein et al., U.S. Pat. No. 6,880,839 to Keeler et al., and U.S. Pat. No. 9,352,628 to Barton et al., each of which is incorporated herein by reference in its entirety.

In some embodiments, the suspension system of the tandem axle assembly is non-torque reactive, or at least substantially non-torque reactive, by having (i) upper and lower control arms coupling the non-drive lift axle to hanger brackets, (ii) lower control arms coupling the drive axle to the hanger brackets, and (iii) an upper torque member (e.g., a "V-rod" or "torque rod") coupling the drive axle to the frame rails and/or to frame brackets coupled to the hanger brackets. Non-torque reactive suspension designs differ from torque reactive suspension designs based primarily on the configuration of the control arms counteracting the torque acting on the axle during braking and acceleration. A non-torque reactive suspension reduces frame rise during acceleration and frame dive during braking. Significant frame rise can shift load away from the drive axle during acceleration, which can reduce traction of the drive tires. In some embodiments, the non-torque reactive configuration of the present technology inhibits or even prevents significant frame rise from acceleration and the corresponding load shift away from the drive axle in the 6×2 configuration, which increases drive tire traction during acceleration. The embodiments described herein are suitable for use with various types of lift axle configurations, such as steerable and non-steerable lift axles.

Embodiments of the tandem axle assemblies of the present technology can include various components contributing to roll stability of the vehicle. As used herein, roll stability refers to a function of the suspension system resisting lateral rotation of an axle (e.g., rotation of the axle about a longitudinal axis of the vehicle) caused by vehicle movement, which would occur when one end of the axle has a different load than the other end (e.g., as the center of gravity of the vehicle shifts during cornering, uneven road surfaces, road tilt, etc.). Roll stability inhibits or even prevents shift of the vehicle chassis and body (cab, box, etc.) during vehicle movement, which can inhibit or even prevent unstable movement of the vehicle. In some embodiments, the suspension system provides roll stability to the vehicle by means of a cross tube (e.g., a torque tube) between the lower control arms opposite the hanger bracket, the air springs operably coupled between the axle and the frame rails, etc. In some embodiments, the suspension system coupled to the non-drive lift axle does not include dedicated roll stability components, thereby reducing weight of the non-drive lift axle side of the suspension system.

The non-drive lift axles of the present technology can be moved between engagement and disengagement with the road surface by a variety of lifting configurations. In some embodiments, the non-drive lift axle includes a lifting system having a lifting component (e.g., a winch, an actuator, etc.) operably coupling the axle to the frame of the vehicle, a lifting component (e.g., a lift spring, a winch, etc.) operably coupling the control arms to the frame of the vehicle, or can include any other suitable lifting component and/or system to move the non-drive lift axle upward and/or downward between engagement and disengagement with the road surface. In some embodiments, one or more active control components and/or systems can be included in the tandem axle assembly to control movement of the non-drive lift axle (e.g., sensors, valves, programmable logic controllers (PLC), etc.). In an example, during various vehicle dynamic scenarios, such active lift axle control systems can include sensors to automate adjustment of vehicle weight on the non-drive lift axle to distribute more weight onto the drive axle (i.e., by at least partially raising the lift axle) and increase traction on the drive tires for improved acceleration and braking. In other embodiments, control of the weight distribution across the tandem axle assembly can be adjusted dynamically by a location-based tandem axle control system, which adjusts the position of the lift axle based on physical location of the vehicle (e.g., to conform to local/ state regulations). In these embodiments, the location-based tandem axle control system can be linked to one or more location systems (e.g., GPS, route data, etc.) to provide the physical location of the vehicle. Other configurations are also within the scope of the present technology.

Certain details are set forth in the following description and in FIGS. 1-4B to provide a thorough understanding of various embodiments of the present technology. In other instances, well-known structures, systems, materials and/or operations often associated with tandem axle assemblies and associated components, suspension systems, heavy duty trucks and other vehicles, etc. are not shown or described in detail in the present disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used herein is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present disclosure. Those of ordinary skill in the art will also appreciate that further embodiments of the invention can be practiced without several of the details described below. In the Figures, identical reference numbers identify identical, or at least generally similar, elements.

FIG. 1 is a left side (driver side) view of a vehicle 10 having a tandem axle assembly 100 configured in accordance with an embodiment of the present technology. The vehicle 10 includes a cab 18 mounted to a chassis 12. The chassis 12 has two laterally spaced-apart, longitudinally extending frame members 14 (e.g.; frame rails) at a position above a ground surface 20, although only one frame member 14 can be seen in the side view of FIG. 1. The tandem axle assembly 100 includes tandem axles 16a and 16b, of which one or both of the tandem axles 16a and 16b can be drive axles. In some embodiments, one of the tandem axles 16a and 16b can be configured as a lift axle, which will be described in greater detail with respect to FIGS. 2-4B below. In the illustrated embodiment, wheels 15a and 15b are rotatably mounted to opposite end portions of the tandem axles 16a and 16b, respectively. In operation, a lift axle can raise wheels of the lift axle off the ground when the additional support of the lift axle is not needed, and lower wheels of the lift axle into contact with the ground as shown in FIG. 1 when the extra support of the lift axle is needed or desired. In addition to the tandem axle assembly 100, the vehicle 10 can include an auxiliary axle system 22 (e.g., an auxiliary lift axle system) attached to the frame members 14 ahead or behind the tandem axles 16a and 16b (e.g., in a pusher or tag configuration, respectively). The auxiliary lift axle system 22 can include one or more wheels 24 rotatably mounted on opposite sides thereof. In some embodiments, the auxiliary lift axle system 22 is omitted.

For directional reference in the discussion that follows, it will be understood that the vehicle 10 is pointed in a vehicle drive direction VDD and is aligned with a longitudinal axis L. Additionally, it will be understood that a vertical axis V extends upwardly at a right angle to the longitudinal axis L, and that a lateral axis (not shown) extends horizontally transverse to the longitudinal axis L. Although the vehicle 10 is depicted as a concrete mixer for purposes of illustration, the tandem axle assemblies described herein can be used with virtually any type of heavy duty vehicle including, for example, other types of trucks, trailers, etc., with the lift axle of the tandem axle assembly in either a tag and pusher configuration, and with both steerable and non-steerable lift axles. Accordingly, the various embodiments of the present technology described herein are not limited to use with any particular type of vehicle or in any particular type of axle arrangement unless specifically noted otherwise herein.

Figure 2:
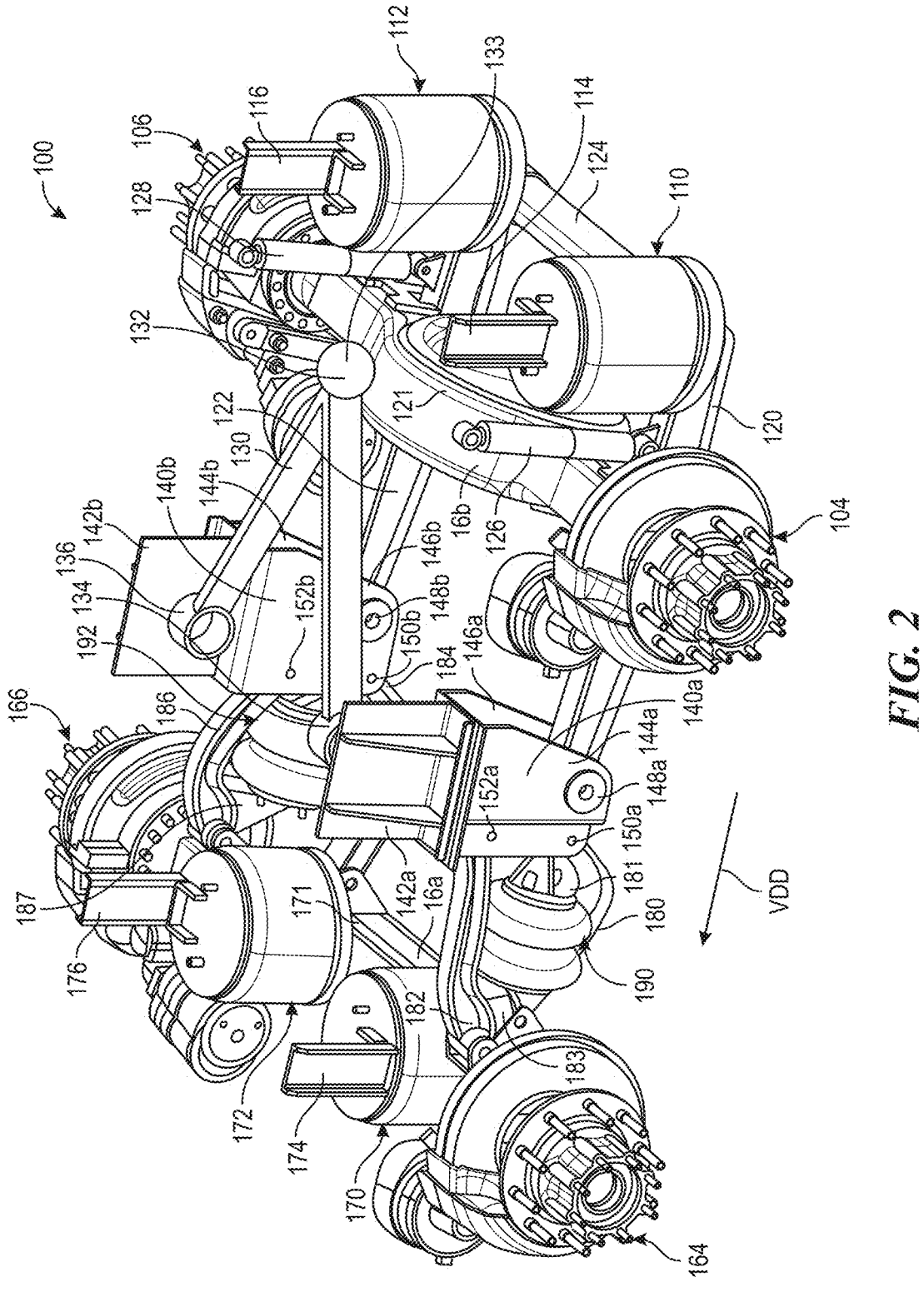
FIG. 2 is a perspective view of a tandem axle assembly configured in accordance with embodiments of the present technology.

FIG. 2 is a perspective view showing the tandem axle assembly 100 configured in accordance with embodiments of the present technology. A number of conventional components normally found on tandem axle assemblies, including wheels, hardware brackets, hydraulic and/or pneumatic lines, wiring, fasteners, etc. and components of the truck or tractor chassis (e.g., the frame rails) have been omitted from the Figures herein for purposes of clarity. The tandem axle assembly 100 includes the tandem axles 16a and 16b and, in the illustrated embodiment (i) the tandem axle 16a is configured as a drive axle ("drive axle 16a," "drive axle assembly 16a," etc.) configured to be driven by power output from an engine of the vehicle 10 through a driveline (not shown), and (ii) the tandem axle 16b is configured as a non-drive lift axle ("non-drive lift axle 16b," "non-drive lift axle assembly 16b," etc.) in a forward position relative to the vehicle drive direction VDD. In other embodiments, the non-drive lift axle 16b can in a rearward position relative to the vehicle drive direction VDD. The drive axle 16b includes a first outer end 104 and a second outer end 106 and the non-drive lift axle 16a includes a third outer end 164 and a fourth outer end 166, each outer end including various components such as, e.g., brake systems, hubs, wheel mount components, etc. The components of the outer ends 104 and 106 can be the same as the components of the outer ends 164 and 166, or can differ in, e.g., weight rating, size, etc.

The drive axle 16b is movably coupled to the frame rails (e.g., the frame members 14 of FIG. 1) by a first load spring assembly 110 having a first frame bracket 114 and a second load spring assembly 112 having a second frame bracket 116. In the illustrated embodiments, the first and second load spring assemblies 110 and 112 are airbags; however, other springs are within the scope of the present technology. The first and second load spring assemblies 110 and 112 operably extend between aft end portions of a first lower control arm 120 and a second lower control arm 122, respectively. Each of the lower control arms 120 and 122 have a medial portion coupled to a beam portion of the drive axle 16b by an axle weldment (not shown) and/or other mechanical attachment structure. A cross tube 124 can be connected between the aft end portions of the first and second lower control arms 120 and 122 to maintain the spacing of the lower control arms 120 and 122 and support the lower portions of the first and second load spring assemblies 110 and 112. The cross tube 124 can also provide roll stability for the suspension system. In some embodiments, the first and second load spring assemblies 110 and 112 can provide some roll stability, but are not dedicated or primary roll stability components.

A first damper 126 is positioned adjacent to the first load spring assembly 110 and is operably coupled between the first lower control arm 120 and the corresponding frame rail, or a component coupled to the corresponding frame rail. A second damper 128 is positioned adjacent to the second load spring assembly 112 and is operably coupled between the second lower control arm 122 and the corresponding frame rail, or a component coupled to the corresponding frame rail. Movement of the first and second load spring assemblies 110 and 112, and thereby the drive axle 16b, can be dampened by the first and second dampers 126 and 128 to control vehicle dynamics. In some embodiments, the first and second dampers 126 and 128 can be conventional hydraulic dampers.

In the illustrated embodiment, the tandem axle assembly 100 includes a first frame bracket 142a and a second frame bracket 142b configured to be secured, respectively, to the two spaced part, longitudinally extending frame rails of the vehicle (not shown in FIG. 2 but see, e.g., the frame members 14 of FIG. 1) in a conventional manner. The tandem axle assembly 100 can further include a first hanger bracket 140a configured to be coupled to the first frame bracket 142a, and a second hanger bracket 140b configured to be coupled to the second frame bracket 142b. The first and second hanger brackets 140a and 140b can be fixedly coupled to, releasably coupled to, affixed to, integrally formed with, and/or otherwise connected to the first and second frame brackets 142a and 142b, respectively. The first and second frame brackets 142a and 142b can include various gusseting and/or webbing to strengthen these components. In some embodiments, the first hanger bracket 140a and the first frame bracket 142a comprise a unitary component, and/or the second hanger bracket 140b and the second fame bracket 142b comprise a unitary component.

The first and second lower control arms 120 and 122 can be pivotably coupled to the first hanger bracket 140a and the second hanger bracket 140b, respectively, at ends opposite the first and second load spring assemblies 110 and 112, respectively. The hanger brackets 140a and 140b can include outer web portions 144a and 144b (which can also be referred to as flange portions), respectively, and inner web portions 146a and 146b, respectively. The web portions 144a and 146a are spaced apart to receive the first lower control arm 120, and the web portions 144b and 146b are spaced apart to receive the second lower control arm 122. Each of the first and second hanger brackets 140a and 140b can include lower control arm mounting apertures 148a and 148b that receives a fastener (e.g., a pin, bolt, etc.; not shown) that extends through a portion of the lower control arms 120 and 122, e.g., through a bushing, a bearing, or other suitable component to pivotably couple the hanger brackets 140a and 140b to the respective control arms 120 and 122.

A V-rod 130 can be positioned to further couple the drive axle 16b to the frame rails. The V-rod 130 can have an axle mount end 132, a first frame mount end 134, and a second frame mount end 136. In some embodiments, the axle mount end 132 can have an attachment portion, e.g., a socket 133 that is configured to receive a corresponding ball (not shown) on an upper portion of an axle housing 121 of the drive axle 16b and permit limited rotation of the ball relative to the socket 133 in operation. The ball/socket arrangement of the V-rod 130 is not essential in all embodiments, and other embodiments can include other structural and functional features for attaching the V-rod 130 to the axle housing 121. The axle housing 121 can enclose/house, for example, a differential. The first and second frame mount ends 134 and 136 can have attachment portions, e.g., apertures for receiving pins or bolts (not shown) to pivotably couple the V-rod 130 to the frame rails and/or the frame brackets 142a and 142b, a cross-member coupled to the frame rails and extending therebetween, and/or the like. In some embodiments, one of the frame rails extends between and is secured between the first frame bracket 142a and the first frame mount end 134, and the other of the frame rails extends between and is secured between the second frame bracket 142b and the second frame mount end 136.

In some aspects of the present technology, the configuration of the V-rod 130 allows lateral articulation (rotation of about the longitudinal axis L (FIG. 1)) of the drive axle 16b during use, but counteracts torque reaction of the drive axle 16b about the lateral axis during acceleration and braking (e.g., a non-torque reactive, or at least substantially non-torque reactive, suspension configuration). More specifically, for example, the first lower control arm 120 and the arm of the v-rod 130 extending to the first frame mount end 134 can form a substantially parallelogram-like shape and, likewise, the second lower control arm 120 and the arm of the v-rod 130 extending to the second frame mount end 134 can form a substantially parallelogram-like shape. Such a parallelogram configuration inhibits or even prevents torque on the drive axle 16b (e.g., resulting from braking or acceleration of the vehicle) from acting to raise or lower the hanger brackets 140a and 140b and the frame brackets 142a and 142b, and the vehicle frame coupled thereto. Accordingly, the arrangement of the lower control arms 120 and 122 and the v-rod 130 can be non-torque reactive or, if the parallelogram-shape is not perfect, substantially non-torque reactive.

The non-drive lift axle 16a is movably coupled to the frame rails (e.g., the frame members 14 of FIG. 1) by a third load spring assembly 170 having a third frame bracket 174 and a second load spring assembly 172 having a fourth frame bracket 176. In the illustrated embodiment, the first and second load spring assemblies 170 and 172 are airbags;

however, other springs are within the scope of the present technology. The first and second load spring assemblies 170 and 172 operably extend between a beam portion 171 of the non-drive lift axle 16a and the corresponding frame rails. The non-drive lift axle 16a can be coupled to the first hanger bracket 140a by a first lower control arm 180 and a first upper control arm 182, and to the second hanger bracket 140b by a second lower control arm 184 and a second upper control arm 186. The first and second lower control arms 180 and 184 can be pivotably coupled to the hanger brackets 140a and 140b, respectively, by e.g., pins (not shown) that extend through lower control arm mounting apertures 150a and 150b, and the first and second upper control arms 182 and 186 can be pivotably coupled to the hanger brackets 140a and 140b, respectively, by e.g., pins (not shown) that extend through upper control arm mounting apertures 152a and 152b. Each of the apertures 150a, 150b, 152a, and 152b is configured to receive a fastener (e.g. a pin) that extends through an aft end portion of the control arms 180, 182, 184, and 186, e.g., through a bushing, a bearing, or other suitable component carried on the aft end of the respective control arm.

In some aspects of the present technology, the configuration of the lower control arms 180 and 184 with respect to the upper control arms 182 and 186 allows upward and downward movement of the non-drive lift axle 16a during use, but counteracts torque reaction of the non-drive lift axle 16a during braking or acceleration (e.g., the control arm arrangement of this embodiment can provide a non-torque reactive, or at least substantially non-torque reactive, suspension configuration). More specifically, for example, the lower and upper control arms 180, 182 can form a substantially parallelogram-like shape and, likewise, the lower and upper control arms 184, 186 can form a substantially parallelogram-like shape. Such a parallelogram configuration inhibits or even prevents torque on the lift axle 16a (e.g., resulting from braking or acceleration of the vehicle) from acting to raise or lower the hanger brackets 140a and 140b, and the vehicle frame coupled thereto. Accordingly, the arrangement of the control arms 180, 182, 184, 186 can be non-torque reactive or, if the parallelogram-shape of the control arms is not perfect, substantially non-torque reactive.

The illustrated embodiments of the suspension system related to the non-drive lift axle 16a do not include dedicated roll stability components, e.g., sway bars, cross tubes, V-rods, etc., and dynamic control of the rear axles of the vehicle is realized through roll stability components of the drive axle 16b, e.g., the cross tube 124, the V-rod 130, etc. Although the non-drive lift axle 16a can exclude dedicated roll stability components, the first and second load spring assemblies 170 and 172 can provide some roll stability to the non-drive lift axle 16a such as, for example, about 30% of what a normal suspension having dedicated roll stability components would provide. In other embodiments, roll stability components can be included with the suspension system related to the non-drive lift axle 16a. Moreover, in some aspects of the present technology the control arms 180, 182 of the non-drive lift axle 16a and the lower control arm 120 of drive axle 16b are coupled to the common first hanger bracket 140a, which is secured to the frame of the vehicle via the first frame bracket 142a. Likewise, the control arms 184, 186 of the non-drive lift axle 16a and the lower control arm 122 of drive axle 16b are coupled to the common second hanger bracket 140b, which is secured to the frame of the vehicle via the second frame bracket 142b.

In operation, the non-drive lift axle 16a may be moved to a lowered position (deployed or active) or to a raised position (stowed or inactive). Such movement can be facilitated by any suitable component, e.g., a lifting component (e.g., a winch, a hydraulic, pneumatic, mechanical and/or electromechanical actuator, etc.) operably coupled between the non-drive lift axle 16a and the frame of the vehicle, between the upper control arms 182 and 184 and the frame of the vehicle, or between components of the tandem axle assembly 100. In the illustrated embodiment of FIG. 2, the tandem axle assembly 100 includes a first lift spring assembly 190 coupled between an aft support 181 on the first lower control arm 180 and a forward support 183 on the first upper control arm 182, and a second lift spring assembly 192 coupled between an aft support (not shown) on the second lower control arm 184 and a forward support 187 on the second upper control arm 186. In operation, extension of the first and second lift spring assemblies 190 and 192 (e.g., by inflation of the lift spring airbags) causes the non-drive lift axle 16a to rise toward the frame rails such that the wheels (not shown) of the non-drive lift axle 16a rise off of the ground, disengaging the non-drive lift axle 16a from the ground. Conversely, deflation of the first and second lift spring assemblies 190 and 192 with corresponding inflation of the first and second load spring assemblies 170 and 172 causes the non-drive lift axle 16a to move downwardly toward the lowered position, such that the wheels (not shown) of the non-drive lift axle 16a come into contact with the ground. Examples of air springs are disclosed in International PCT Publication No. WO 2006/071172 of Terborn, et al, and in U.S. Pat. No. 4,934,667 to Pees, et al, which are also incorporated herein by reference in their entireties.

In some embodiments, the load spring assemblies 170 and 172 can be pneumatically coupled to the lift spring assemblies 190 and 192, respectively, to facilitate damping of the non-drive lift axle. For example, the load spring assemblies 170 and 172 and/or the lift spring assemblies 190 and 192 can include some features generally similar or identical in structure and/or function to those of the auxiliary suspension air damping systems described in U.S. Pat. No. 10,543,730, filed Feb. 6, 2018, and titled "AUXILIARY SUSPENSION AIR DAMPING SYSTEMS AND ASSOCIATED METHODS OF MANUFACTURE AND USE," which is incorporated herein by reference in its entirety. In other embodiments, the non-drive lift axle 16a may include a shock absorber (not shown), e.g., a conventional hydraulic shock absorber, that operably extends between the non-drive lift axle 16a and the frame rails, or other structure mounted to the frame rails to provide damping to the non-drive lift axle 16a.

Figures 3A, 3B:
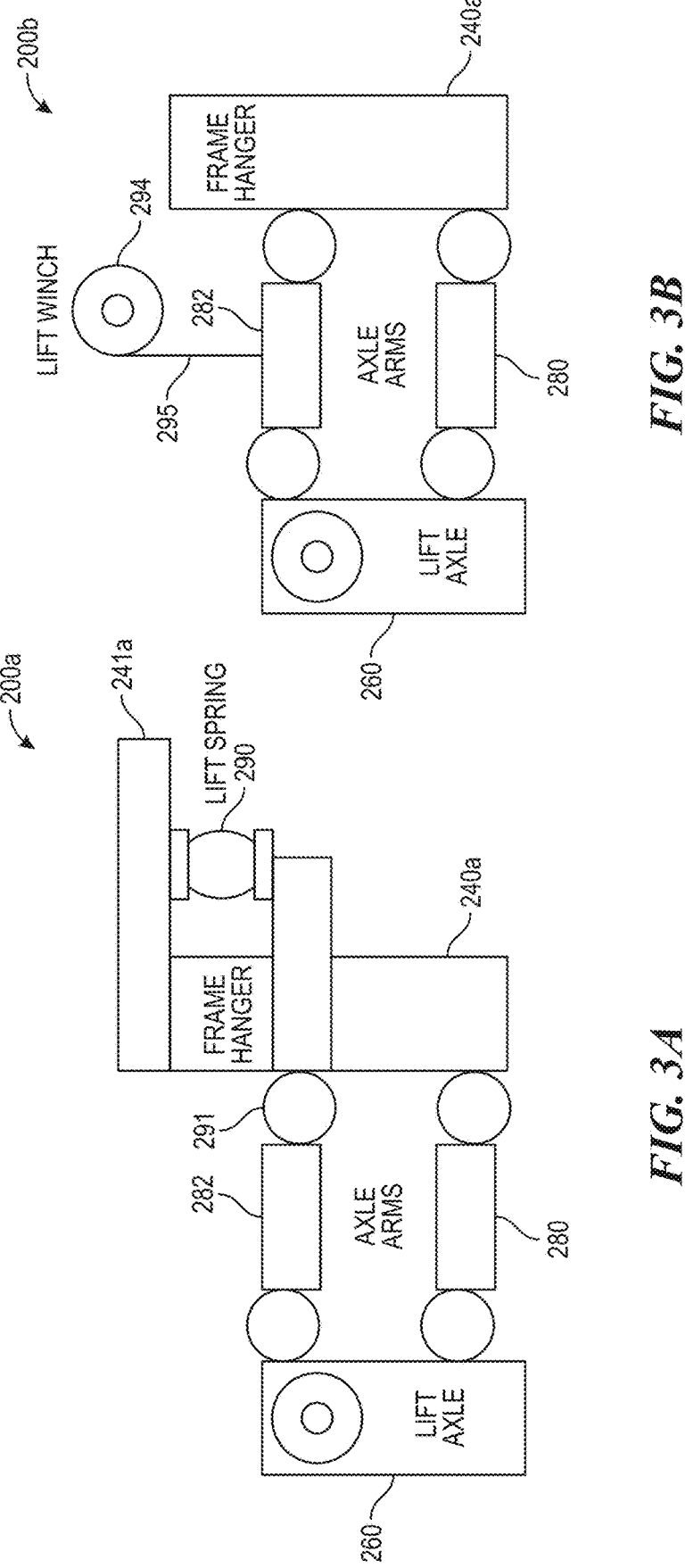
FIGS. 3A and 3B are schematic diagrams of a tandem axle assembly configured in accordance with other embodiments of the present technology, with FIG. 3A showing a lift spring acting on a control arm for lifting the lift axle, and FIG. 3B showing a lifting winch coupled to the control arm for lifting the lift axle.

FIGS. 3A and 3B are schematic diagrams of a tandem axle assembly configured in accordance with other embodiments of the present technology, with FIG. 3A showing a lift spring 290 acting on a control arm 282 for lifting the lift axle 260, and FIG. 3B showing a lifting winch 294 coupled to the control arm 282 for lifting the lift axle 260. The diagrams of FIGS. 3A and 3B have similar components to the tandem axle assembly 100 shown in FIG. 2, with components related to those of FIG. 2 having similar reference numerals in FIGS. 3A and 3B, except in the 200-series. FIG. 3A shows a tandem axle assembly 200a having a configuration generally similar to the configuration of the tandem axle assembly 100 described above. In this regard, a non-drive lift axle 260 is coupled to a hanger bracket 240a by a lower control arm 280 and an upper control arm 282. A lift spring assembly 290 can operably extend between an end portion of the upper control arm 282 opposite the lift axle 260, and a portion 241a of the hanger bracket 240a. As noted above, inflation of the lift spring assembly 290 causes the non-drive lift axle 260 to move to a raised position by rotating the upper control arm 282 about a pivot point 291, and deflation of the left axle assembly 290 causes the non-drive lift axle 260 to move to a lowered position.

FIG. 3B shows a tandem axle assembly 200b having the non-drive lift axle 260 coupled to the hanger bracket 240a by the lower control arm 280 and the upper control arm 282. In the illustrated embodiment, the assembly 200b includes a lift winch 294 (e.g., an electric powered winch) fixedly coupled to the frame rail or a component coupled to the frame rail of the vehicle (not shown). The winch 262 is operably coupled to the upper control arm 282 and configured to move the non-drive axle 260 between the lowered and raised positions. The lift winch 294 operably couples to the upper control arm 282 by a cable 295 operably coupled to a pulley. In other embodiments, the lift winch 294 can be operably coupled to any position on the upper control arm 282, the lower control arm 280, or any other component of the non-drive lift axle 260, and/or the lift winch 294 may be located and/or configured such that the pulley is omitted, or multiple pulleys may be used to route the cable from the lift winch 294 to the upper control arm 282 for lifting operation. In operation, the winch can be used to raise the non-drive lift axle 260 by pulling in the cable which, in turn, causes the upper control arm 282 (and the lower control arm 280) to pivot upwardly about the frame bracket 240a and thereby raise the non-drive lift axle 260, or can lower the non-drive lift axle 260 by paying out the cable which effectuates the opposite movement of the upper and lower control arms 282 and 280, respectively.

Figures 4A, 4B:
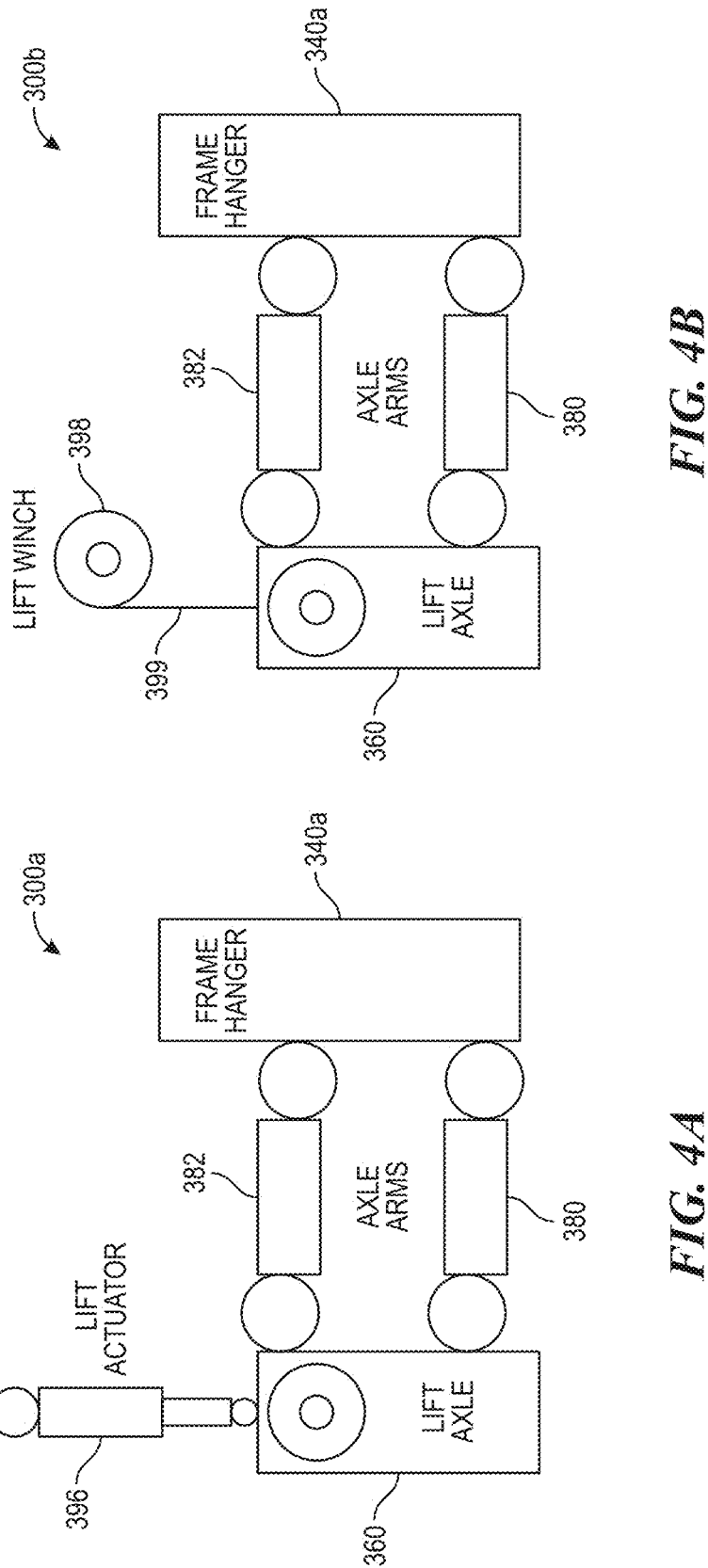
FIGS. 4A and 4B are schematic diagrams of a tandem axle assembly configured in accordance with additional embodiments of the present technology, with FIG. 4A showing an actuator acting on an axle for lifting the lift axle, and FIG. 4B showing a lifting winch coupled to the axle for lifting the lift axle.

FIGS. 4A and 4B are schematic diagrams of a tandem axle assembly configured in accordance with additional embodiments of the present technology, with FIG. 4A showing an actuator 396 acting on an axle 360 for lifting the lift axle 360, and FIG. 4B showing a lifting winch 398 coupled to the axle 360 for lifting the lift axle 360. The diagrams of FIGS. 4A and 4B have similar components to the tandem axle assembly 100 shown in FIG. 2, with components related to those of FIG. 2 having similar reference numerals in FIGS. 4A and 4B, except in the 300-series. FIG. 4A shows a tandem axle assembly 300a having a non-drive lift axle 360 coupled by a lower control arm 380 and an upper control arm 382 to a hanger bracket 340a. In the illustrated embodiment, the assembly 300a includes a linear lift actuator 396 operable between the chassis of the vehicle and the non-drive lift axle 360 to directly pull the chassis and the non-drive lift axle 360 together to move the non-drive lift axle 360 to a raised position (e.g., a telescoping hydraulic cylinder pulling the components to the raised position). Conversely, the linear lift actuator 396 can extend to move the non-drive lift axle 360 to a lowered position.

FIG. 4B shows a tandem axle assembly 300b having the non-drive lift axle 360 coupled to the hanger bracket 340a by the lower control arm 380 and the upper control arm 382. The tandem mass assembly 300b is similar in configuration to the tandem axle assembly 200b, except that a lift winch 398 (e.g., an electric powered winch) is operably coupled directly to the non-drive lift axle 360 as opposed to the upper control arm 382. The lift winch 398 operably couples to the non-drive lift axle 360 by a cable 399 operably coupled to a pulley. In other embodiments, the lift winch 398 can be operably coupled to any position on the non-drive lift axle 360, and the lift winch 398 may be located and/or configured such that the pulley is omitted, or multiple pulleys may be used to route the cable from the lift winch 398 to the non-drive lift axle 360 for lifting operation. In operation, the winch can be used to raise the non-drive lift axle 360 by pulling in the cable which, in turn, causes the upper control arm 382 (and the lower control arm 380) to pivot upwardly about the frame bracket 340*a* and thereby raise the non-drive lift axle 360, or can lower the non-drive lift axle 360 by paying out the cable, which effectuates the opposite movement of the upper and lower control arms 382 and 380, respectively.

In other embodiments, the non-drive lift axles 260 and 360 may be raised and lowered using the following example systems, among other possible configurations: (1) an electric motor connected at or near bushings at either end of the upper and lower control arms 280/380 and 282/382 and engaging a gear to power the non-drive lift axles 260/360 to the raised position, and may include a latch in the stowed position; (2) a linear actuator operating through a cable or linkage coupled to the non-drive lift axles 260/360; and/or (3) an electromagnetic device operably coupled between the chassis of the vehicle and the non-drive lift axles 260/360 or the upper and/or lower control arms 280/380 and 282/382 by providing electromagnetic force between one or more components of the chassis and the non-drive lift axles 260/360 to raise the non-drive lift axles 260/360.

Although embodiments of tandem axle assemblies are described herein in the context of vehicles having a 6×2 configuration, the tandem axle assemblies described herein can be used with virtually any type of heavy duty vehicle including, for example, other types of trucks, trailers, etc., in both "tag" and "pusher" configurations and with both steerable and non-steerable lift axles. Accordingly, the various embodiments of the present technology described herein are not limited to use with a particular type of vehicle.

The following examples are illustrative of several embodiments of the present technology:

1. A tandem axle assembly for use with a vehicle, comprising:
   a bracket configured to be coupled to a frame of a vehicle;
   a lift axle;
   a lifting system operably coupled to the lift axle, wherein the lifting system is configured to move the lift axle between a lowered position and a raised position;
   a lift axle suspension system operably coupling the lift axle to the bracket;
   a drive axle configured to be coupled to a drive system of the vehicle; and
   a drive axle suspension system operably coupling the drive axle to the bracket.

2. The tandem axle assembly of example 1 wherein the lift axle suspension system comprises:
   a lower control arm coupling the lift axle to the bracket, wherein the lower control arm is pivotably coupled to the bracket; and
   an upper control arm coupling the lift axle to the bracket, wherein the upper control arm is pivotably coupled to the bracket.

3. The tandem axle of assembly of example 2 wherein the lifting system comprises a lift spring operably coupled between the lower control arm and the upper control arm, and wherein the lift spring is configured to move the lift axle between the lowered position and the raised position.

4. The tandem axle assembly of example 3 wherein the lift spring includes an airbag, and wherein inflation of the airbag moves the lift axle away from the lowered position and toward the raised position.

5. The tandem axle assembly of any one of examples 1-4 wherein the lift axle is configured to be positioned in front of the drive axle relative to a forward vehicle drive direction.

6. The tandem axle assembly of any one of examples 1-5 wherein the lift axle suspension system comprises a control arm coupling the lift axle to the bracket, wherein the control arm is pivotably coupled to the bracket.

7. The tandem axle assembly of example 6 wherein the lifting system comprises a lift spring coupled to the control arm and configured to act on the control arm to move the lift axle between the lowered position and the raised position.

8. The tandem axle assembly of example 6 or example 7 wherein the lifting system comprises a winch coupled to the control arm and configured to act on the control arm to move the lift axle between the lowered position and the raised position.

9. The tandem axle assembly of any one of examples 1-8 wherein the lifting system comprises a lift spring configured to be coupled between the lift axle and the frame and to act on the lift axle to move the lift axle between the lowered position and the raised position.

10. The tandem axle assembly of any one of examples 1-9 wherein the lifting system comprises a winch configured to be coupled between the lift axle and the frame and to act on the lift axle to move the lift axle between the lowered position and the raised position.

11. The tandem axle assembly of any one of examples 1-10 wherein the drive axle suspension system is configured to provide roll stability to the vehicle.

12. The tandem axle assembly of any one of examples 1-11 wherein the drive axle suspension system and the lift axle suspension system are each configured to be at least substantially non-torque reactive.

13. The tandem axle assembly of any one of examples 1-12 wherein the drive axle suspension system comprises a control arm coupling the drive axle to the bracket, wherein the control arm is pivotably coupled to the bracket.

14. The tandem axle assembly of example 13 wherein the drive axle suspension system further comprises a v-rod having:
   an axle mount end coupled to the drive axle;
   a first frame mount end configured to be coupled to the frame; and
   a second frame mount end configured to be coupled to the frame.

15. A tandem axle assembly for use with a vehicle, comprising:
   a first bracket configured to be coupled to a frame of the vehicle;
   a second bracket configured to be coupled to the frame of the vehicle;
   a lift axle;
   a lifting system operably coupled to the lift axle, wherein the lifting system is configured to move the lift axle between a lowered position and a raised position;
   a first lift axle control arm coupling the lift axle to the first bracket, wherein the first lift axle control arm is pivotably coupled to the first bracket;
   a second lift axle control arm coupling the lift axle to the second bracket, wherein the second lift axle control arm is pivotably coupled to the second bracket;
   a drive axle configured to be coupled to a drive system of the vehicle;
   a first drive axle control arm coupling the drive axle to the first bracket, wherein the first drive axle control arm is pivotably coupled to the first bracket; and
   a second drive axle control arm coupling the drive axle to the second bracket, wherein the second drive axle control arm is pivotably coupled to the second bracket.

16. The tandem axle assembly of example 15, further comprising a V-rod having:

an axle mount end coupled to the drive axle;

a first frame mount end configured to be coupled to the frame; and a second frame mount end configured to be coupled to the frame.

17. The tandem axle assembly of example 15 or example 16, further comprising a cross tube coupling an aft end portion of the first drive axle control arm to an aft end portion of the second drive axle control arm.

18. The tandem axle assembly of any one of examples 15-17 wherein the first lift axle control arm is a first lower lift axle control arm coupling the lift axle to a lower portion of the first bracket, wherein the second lift axle control arm is a second lower lift axle control arm coupling the lift axle to a lower portion of the second bracket, and further comprising:

a first upper lift axle control arm coupling the lift axle to an upper portion of the first bracket, wherein the first upper lift axle control arm is pivotably coupled to the upper portion of first bracket; and a second upper lift axle control arm coupling the lift axle to an upper portion of the second bracket, wherein the second upper lift axle control arm is pivotably coupled to the upper portion of the second bracket.

19. The tandem axle assembly of example 18 wherein the lifting system comprises:

a first lift spring coupled between the first lower lift axle control arm and the first upper lift axle control arm; and a second lift spring coupled between the second lower lift axle control arm and the second upper lift axle control arm.

20. The tandem axle assembly of any one of examples 15-19 wherein the first lift axle control arm is not directly coupled to the second lift axle control arm via a cross member other than the lift axles.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

As used herein, the use of relative terminology, such as "about," "generally," "approximately," "substantially," and the like refer to the stated value plus or minus ten percent. For example, the use of the term "about 100" refers to a range of from 90 to 110, inclusive. In instances in which the context requires otherwise and/or relative terminology is used in reference to something that does not include, or is not related to, a numerical value, the terms are given their ordinary meaning to one skilled in the art.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A tandem axle for use with a vehicle, comprising:
   a bracket configured to be coupled to a frame of the vehicle;
   a lift axle;
   a lifting system operably coupled to the lift axle, wherein the lifting system is configured to move the lift axle between a lowered position and a raised position;
   a lift axle suspension system comprising:
      a lower control arm coupling the lift axle to the bracket, wherein the lower control arm is pivotably coupled to the bracket; and
      an upper control arm coupling the lift axle to the bracket, wherein the upper control arm is pivotably coupled to the bracket;
   a drive axle configured to be coupled to a drive system of the vehicle; and
   a drive axle suspension system operably coupling the drive axle to the bracket.

2. The tandem axle of assembly of claim 1 wherein the lifting system comprises a lift spring operably coupled between the lower control arm and the upper control arm, and wherein the lift spring is configured to move the lift axle between the lowered position and the raised position.

3. The tandem axle assembly of claim 2 wherein the lift spring includes an airbag, and wherein inflation of the airbag moves the lift axle away from the lowered position and toward the raised position.

4. A tandem axle assembly for use with a vehicle, comprising:
   a bracket configured to be coupled to a frame of the vehicle;
   a lift axle;
   a lifting system operably coupled to the lift axle, wherein the lifting system is configured to move the lift axle between a lowered position and a raised position;
   a lift axle suspension system comprising a control arm coupling the lift axle to the bracket, wherein the control arm is pivotably coupled to the bracket;
   a drive axle configured to be coupled to a drive system of the vehicles; and
   a drive axle suspension system operably coupling the drive axle to the bracket.

5. The tandem axle assembly of claim 4 wherein the lift axle is configured to be positioned in front of the drive axle relative to a forward vehicle drive direction.

6. The tandem axle assembly of claim 4 wherein the lifting system comprises a lift spring coupled to the control arm and configured to act on the control arm to move the lift axle between the lowered position and the raised position.

7. The tandem axle assembly of claim 4 wherein the lifting system comprises a winch coupled to the control arm and configured to act on the control arm to move the lift axle between the lowered position and the raised position.

8. The tandem axle assembly of claim 4 wherein the lifting system comprises a lift spring configured to be coupled between the lift axle and the frame and to act on the lift axle to move the lift axle between the lowered position and the raised position.

9. The tandem axle assembly of claim 4 wherein the lifting system comprises a winch configured to be coupled between the lift axle and the frame and to act on the lift axle to move the lift axle between the lowered position and the raised position.

10. The tandem axle assembly of claim 4 wherein the drive axle suspension system is configured to provide roll stability to the vehicle.

11. The tandem axle assembly of claim 4 wherein the drive axle suspension system and the lift axle suspension system are each configured to be at least substantially non-torque reactive.

12. A tandem axle assembly for use with a vehicle comprising;
   a bracket configured to be coupled to a frame of a vehicle;
   a lift axle;
   a lifting system operably coupled to the lift axle, wherein the lifting system is configured to move the lift axle between a lowered position and a raised position;
   a lift axle suspension system operably coupling the lift axle to the bracket;
   a drive axle configured to be coupled to a drive system of the vehicle; and
   a drive axle suspension system comprising a control arm coupling the drive axle to the bracket, wherein the control arm is pivotably coupled to the bracket.

13. The tandem axle assembly of claim 12 wherein the drive axle suspension system further comprises a v-rod having:
   an axle mount end coupled to the drive axle;
   a first frame mount end configured to be coupled to the frame; and
   a second frame mount end configured to be coupled to the frame.

14. A tandem axle assembly for use with a vehicle, comprising:
   a first bracket configured to be coupled to a frame of the vehicle;
   a second bracket configured to be coupled to the frame of the vehicle;
   a lift axle;
   a lifting system operably coupled to the lift axle, wherein the lifting system is configured to move the lift axle between a lowered position and a raised position;
   a first lift axle control arm coupling the lift axle to the first bracket, wherein the first lift axle control arm is pivotably coupled to the first bracket;
   a second lift axle control arm coupling the lift axle to the second bracket, wherein the second lift axle control arm is pivotably coupled to the second bracket;
   a drive axle configured to be coupled to a drive system of the vehicle;
   a first drive axle control arm coupling the drive axle to the first bracket, wherein the first drive axle control arm is pivotably coupled to the first bracket; and
   a second drive axle control arm coupling the drive axle to the second bracket, wherein the second drive axle control arm is pivotably coupled to the second bracket.

15. The tandem axle assembly of claim 14, further comprising a V-rod having:
   an axle mount end coupled to the drive axle;
   a first frame mount end configured to be coupled to the frame; and a second frame mount end configured to be coupled to the frame.

16. The tandem axle assembly of claim 14, further comprising a cross tube coupling an aft end portion of the first drive axle control arm to an aft end portion of the second drive axle control arm.

17. The tandem axle assembly of claim 14 wherein the first lift axle control arm is a first lower lift axle control arm coupling the lift axle to a lower portion of the first bracket, wherein the second lift axle control arm is a second lower lift axle control arm coupling the lift axle to a lower portion of the second bracket, and further comprising:

a first upper lift axle control arm coupling the lift axle to an upper portion of the first bracket, wherein the first upper lift axle control arm is pivotably coupled to the upper portion of first bracket; and a second upper lift axle control arm coupling the lift axle to an upper portion of the second bracket, wherein the second upper lift axle control arm is pivotably coupled to the upper portion of the second bracket.

18. The tandem axle assembly of claim 17 wherein the lifting system comprises:

a first lift spring coupled between the first lower lift axle control arm and the first upper lift axle control arm; and a second lift spring coupled between the second lower lift axle control arm and the second upper lift axle control arm.

19. A tandem axle assembly for use with a vehicle, comprising:

a first bracket configured to be coupled to a frame of the vehicle;

a second bracket configured to be coupled to the frame of the vehicle;

a lift axle;

a lifting system operably coupled to the lift axle, wherein the lifting system is configured to move the lift axle between a lowered position and a raised position;

a first lift axle control arm coupling the lift axle to the first bracket, wherein the first lift axle control arm is pivotably coupled to the first bracket;

a second lift axle control arm coupling the lift axle to the second bracket, wherein the second lift axle control arm is pivotably coupled to the second bracket, and wherein the first lift axle control arm is not directly coupled to the second lift axle control arm via a cross member other than the lift axle;

a drive axle configured to be coupled to a drive system of the vehicle;

a first drive axle control arm coupling the drive axle to the first bracket, wherein the first drive axle control arm is pivotably coupled to the first bracket; and a second drive axle control arm coupling the drive axle to the second bracket, wherein the second drive axle control arm is pivotably coupled to the second bracket.

* * * * *